United States Patent
Cain

(10) Patent No.: US 10,830,025 B2
(45) Date of Patent: Nov. 10, 2020

(54) ULTRASONIC WELD BETWEEN COMPONENTS OF AN ELECTRICAL SUBMERSIBLE PUMP ASSEMBLY

(71) Applicant: BAKER HUGHES, A GE COMPANY, LLC, Houston, TX (US)

(72) Inventor: Sean A. Cain, Tulsa, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 199 days.

(21) Appl. No.: 16/150,181

(22) Filed: Oct. 2, 2018

(65) Prior Publication Data

US 2019/0134739 A1    May 9, 2019

Related U.S. Application Data

(60) Provisional application No. 62/583,916, filed on Nov. 9, 2017.

(51) Int. Cl.
    *E21B 43/12*      (2006.01)
    *E21B 17/02*      (2006.01)
    *B23K 20/10*      (2006.01)

(52) U.S. Cl.
CPC ............ *E21B 43/128* (2013.01); *E21B 17/02* (2013.01); *B23K 20/10* (2013.01)

(58) Field of Classification Search
CPC .......... E21B 43/128; E21B 17/02; F16L 5/04; F16L 23/20; F16L 21/03; F16L 9/043; F16L 9/046
See application file for complete search history.

(56) References Cited

U.S. PATENT DOCUMENTS

| | | | |
|---|---|---|---|
| 3,068,946 A * | 12/1962 | Frisby | E21B 7/06 175/73 |
| 4,294,559 A | 10/1981 | Schutzler | |
| 4,815,547 A * | 3/1989 | Dillon | G01G 3/1406 177/211 |
| 9,303,648 B2 | 4/2016 | Mack | |
| 9,366,120 B2 | 6/2016 | Merrill et al. | |
| 9,920,773 B2 | 3/2018 | Wilson et al. | |
| 2005/0127668 A1 | 6/2005 | Mobley et al. | |
| 2012/0205113 A1 | 8/2012 | Mailand | |
| 2014/0169988 A1 | 6/2014 | Pesek et al. | |
| 2015/0275621 A1* | 10/2015 | Ringgenberg | E21B 34/063 166/378 |
| 2016/0032928 A1 | 2/2016 | Knapp et al. | |

OTHER PUBLICATIONS

International Search Report and Written Opinion for PCT/US2018/052066 dated Jan. 25, 2019.

* cited by examiner

*Primary Examiner* — D. Andrews
(74) *Attorney, Agent, or Firm* — Bracewell LLP; James E. Bradley

(57) ABSTRACT

A downhole well pump assembly includes a pump and a motor. The motor has a motor housing with a motor head adapter on one end, the motor head adapter having a threaded connector. A seal section seals around a shaft of the motor, the seal section having a seal section adapter connected to the motor head adapter with the threaded connector. The motor head adapter and the motor housing have cylindrical exterior surfaces and end faces that face each other, defining a joint between the end faces. A first strip of metal foil is welded around the exterior surfaces of the motor head adapter and the motor housing at the joint, sealing the entry of well fluids into the joint.

12 Claims, 2 Drawing Sheets

ULTRASONIC WELD BETWEEN COMPONENTS OF AN ELECTRICAL SUBMERSIBLE PUMP ASSEMBLY

CROSS REFERENCE TO RELATED APPLICATION

This application claims priority to provisional application Ser. No. 62/583,916, filed Nov. 9, 2017.

FIELD OF DISCLOSURE

The present disclosure relates to an electrical submersible pump assemblies. More particularly, the disclosure relates to an ultrasonic weld between certain components of the assembly.

BACKGROUND

Many hydrocarbon producing wells employ electrical submersible pumps (ESP). A typical ESP has a pump driven by an electrical motor. A seal section connects between the motor and the pump to seal around the shaft, and often to reduce a pressure differential between the well fluid and motor lubricant in the motor. The ESP may have other modules, such as a gas separator or additional pumps, motors and seal sections that are connected in tandem.

Some of the modules of an ESP can be 30 feet or more long, so are usually brought to a well site separately, then connected to the other modules. Each module normally has an adapter with a threaded connector for connecting to other modules. The threaded connector is usually an external flange with bolt holes for bolting two modules together. Each adapter secures by threaded engagement to a tubular housing of its module.

The threaded connection of the adapter to its housing creates a joint. The threaded connection of the adapter of one module to the adapter of another module also creates a joint between the two adapters. Sealing these joints can be challenging for well environments where pressure, corrosive fluids, moisture and contaminants must be blocked from transmission through the joint. Most joints are sealed by elastomeric seal rings or gaskets.

SUMMARY

A downhole well assembly comprises tubular first and second components having a common longitudinal axis, cylindrical exterior surfaces and end faces that face each other, defining a joint between the end faces. Layers of a metal foil are welded to the exterior surfaces of the first and second components around the joint, sealing the entry of well fluids into the joint.

In the embodiment shown, an annular recess has a portion formed on the exterior surface of the first component adjacent the end face of the first component and another portion formed on the exterior surface of the second component adjacent the end face of the second component. The layers of metal foil are welded around the recess.

In one embodiment, a nose of the first component extends past the end face of the first component into the interior of the second component. Mating threads on an exterior of the nose and an internal side wall of the second component secure the first component to the second component. As a backup, a seal ring may seal between an exterior portion of the nose and the internal side wall of the second component.

In another embodiment, the metal foil provides a sole load bearing connection between the first and second components.

In the embodiment shown, an external flange extends outward from each of the first and second components. The flanges have abutting surfaces that define the end faces. The flanges are bolted together, and the cylindrical exterior surfaces are located on outer diameters of each of the flanges.

In the embodiments shown, the assembly comprises an electrical submersible pump having first and second modules. The first component comprises an adapter of the first module, the adapter having a threaded connector that secures the first module to the second module. The second component comprises a tubular housing of the first module.

In the embodiments shown, the first and second modules comprise a motor module and a seal section module. The first component comprises an adapter of the motor module, the adapter having an external flange with bolt holes for securing the motor module to the seal section module. The second component comprises a tubular motor housing. The adapter may have a nose that extends into the interior of the motor housing. Mating threads between the nose and an internal side wall of the motor housing secure the adapter to the motor housing.

DETAILED DESCRIPTION

Figure 1:
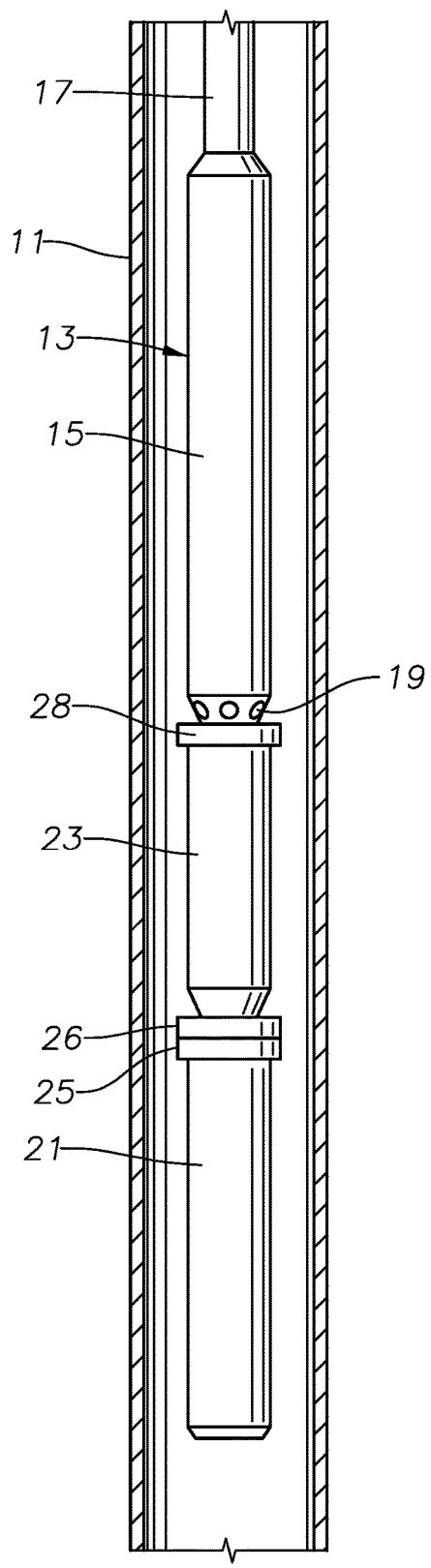
FIG. 1 is a side view of an electrical submersible pump assembly having components welded to each other in accordance with this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 illustrates a cased well 11 extending downward from a wellhead (not shown). Cased well 11 contains an electrical submersible pump (ESP) 13 for pumping well fluid flowing into cased well 11. ESP 13 has a pump 15 suspended on a string of production tubing 17. Pump 15 may be a centrifugal pump having a large number of stages, each stage having an impeller and a diffuser. Alternately, pump 15 could be other types, such as a progressing cavity pump. Pump 15 has a well fluid intake 19 and is driven by a motor 21, normally a three-phase electrical motor.

A seal section 23 connects to motor 21 to seal around a drive shaft assembly (not shown) driven by motor 21 to power pump 15. Normally, seal section 23 will contain a separate segment of the drive shaft assembly and a mechanical face seal that seals around an upper end of the segment of the drive shaft assembly. Seal section 23 may also have a pressure equalizer element, such as a flexible bag or bellows, to reduce a pressure differential between a dielectric lubricant in motor 21 and the hydrostatic pressure of the well fluid surround seal section 23. Alternately, the pressure equalizer portion of seal section 23 could be in a separate module mounted to a lower end of motor 21.

ESP 13 may also include other modules, such as a gas separator (not shown), another motor connected in tandem with motor 21, and a sensor and instrument module. If a gas separator is employed, intake 19 would be at a lower end of the gas separator.

Although FIG. 1 shows ESP 13 oriented vertically, ESP 13 could be within an inclined or horizontal portion of cased well 13. The terms "upper", "lower" and the like are used only for convenience herein and not in a limiting manner because ESP 13 is not always operated vertically during operation.

Pump 15, motor 21, and seal section 23 comprise modules of ESP 13 that normally are brought to a well site apart from each other, then secured together. FIG. 1 schematically shows that each module has an adapter on at least one end to connect it with another module. In FIG. 1, adapter 25 on the upper end of motor 21 has an external flange that abuts and bolts to an external flange on an adapter 26 on the lower end of seal section 23. Seal section 23 has an adapter 28 on its upper end that bolts to the intake 19 of pump 15. Rather than bolts, the threaded connector portions of adapters 25, 26 and 28 could comprise spin collar arrangements (not shown) using threaded rotatable collars.

Figure 2:
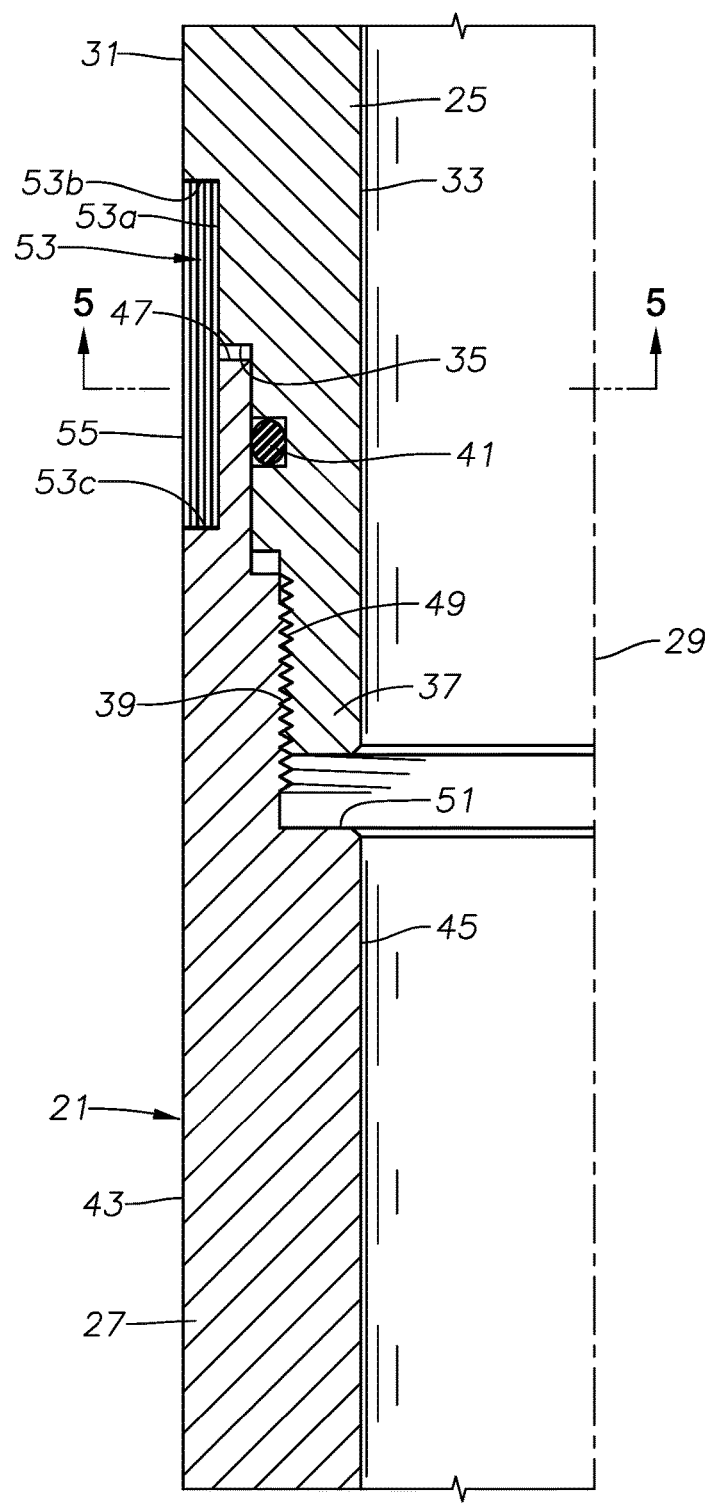
FIG. 2 is a sectional view of parts of two components of the assembly of FIG. 1 secured by threads and with layers of a thin metal foil ultrasonically welded around the threaded joint between the two components to provide a metal barrier against entry of well fluids into the joint.

FIG. 2 illustrates a lower portion of adapter 25, which may be considered to be a head of motor 21 and secures to a motor housing 27. Alternately, FIG. 2 could be considered to be a view of an upper portion of seal section 23, with motor head adapter 25 being seal section upper adapter 28 and motor housing 27 being the housing of seal section 23. Seal section lower adapter 26 and upper adapter 28 (FIG. 1) may have the same features as motor head adapter 25 in FIG. 2.

Motor housing 27 will contain a stator, a rotor, a drive shaft extending along longitudinal axis 29, and bearings for the drive shaft (not shown). Motor housing 27 will be filled with a dielectric lubricant. Motor head adapter 25 has a cylindrical exterior surface 31 and a cylindrical bore or interior surface 33. Adapter 25 has a downward facing shoulder or end face 35 that is in a plane perpendicular to axis 29. Adapter 25 has a cylindrical nose 37 that extends downward past end face 35 and has a set of external threads 39. In this example, an optional elastomeric seal ring 41 locates in a groove on nose 37 between threads 39 and end face 35.

Motor housing 27 also has a cylindrical exterior surface 43 and a cylindrical bore or interior surface 45. Motor exterior surface 43 may have the same outer diameter as adapter exterior surface 31. Motor interior surface 45 may have the same inner diameter as adapter interior surface 33. Motor housing 27 has a rim or end face 47 on its upper end that faces adapter end face 35 and is in a plane perpendicular to axis 29. Motor housing 27 has a set of internal threads 49 that engage adapter threads 39. Motor housing 27 may have an upward facing internal shoulder 51 that faces the lower end of nose 37, and in this embodiment, is spaced a distance below it.

When threads 39, 49 are fully made up, end faces 35, 47 will be in contact each other. Seal ring 41 seals to a portion of motor housing interior surface 45. Even though end faces 35, 47 abut each other when the connection is made up, a potential leak path for well fluid exists in the joint between end faces 35, 47, past seal ring 41 and threads 39, 49 into the interior of adapter 25 and motor housing 27. Some wells produce hydrogen sulfide gas, which can be damaging to internal components within motor 21, such as the insulation on the electrical conductors. The hydrogen sulfide gas could encroach through the elastomer of seal ring 41 into motor housing 27.

An arrangement to block this potential leak path includes optionally forming an annular recess 53 on cylindrical exterior surfaces 31, 43. Annular recess 53 has an upper portion that extends upward a selected distance on adapter exterior surface 31 from adapter end face 35. Annular recess 53 has a lower portion that extends downward a selected distance on motor housing exterior surface 43 from motor housing end face 47. In this example, the upper and lower portions of annular recess 53 equal each other in width, but that could differ. Cylindrical base 53a of annular recess 53 has a depth that may vary. The upper side of annular recess 53 may be a downward facing shoulder 53b in an axis perpendicular to axis 29. The lower side of annular recess 53 may be an upward facing shoulder 53c in an axis perpendicular to axis 29.

A metal foil 55 is welded in layers around annular recess 53 by an ultrasonic welding process. Metal foil 55 comprises a metal strip with a width slightly less than the width of annular recess 53. Metal foil 55 may be wrapped around annular recess 53 in multiple layers, and each layer is welded to adjacent layers. The innermost layer of metal foil 55 is welded to base 53a of annular recess 53. The outermost layer of metal foil 55 may be flush with adapter and housing cylindrical exterior surfaces 31, 43. If so, the thickness of the combined layers of metal foil 55 would be the same as the depth of recess 53. The thickness of each layer of metal foil 55 may vary, such as from about 0.01 to 0.1 inch, but normally 0.01 to 0.02 inch.

The material of metal foil 55 can be a wide variety with softer alloys being easier to join and requiring less power to weld. An example of a suitable material for sealing a joint, but not supporting a tensile load, may be a 300 series stainless steel. The material of adapter 25 and motor housing 27 may be conventional carbon steel. Metal foil 55 seals the joint between end faces 35, 47 against the entry of well fluid.

Ultrasonic welding is a known process that employs vibration to create a friction-like relative motion between two surfaces that are held together under pressure. The relative motion deforms, shears, and flattens local surface asperities, dispersing interface oxides and contaminants, and brings metal-to-metal contact and bonding between the surfaces. The weld process occurs without melting or fusion of the layers of metal foil 55 and base 53c of annular recess 53.

Figure 5:
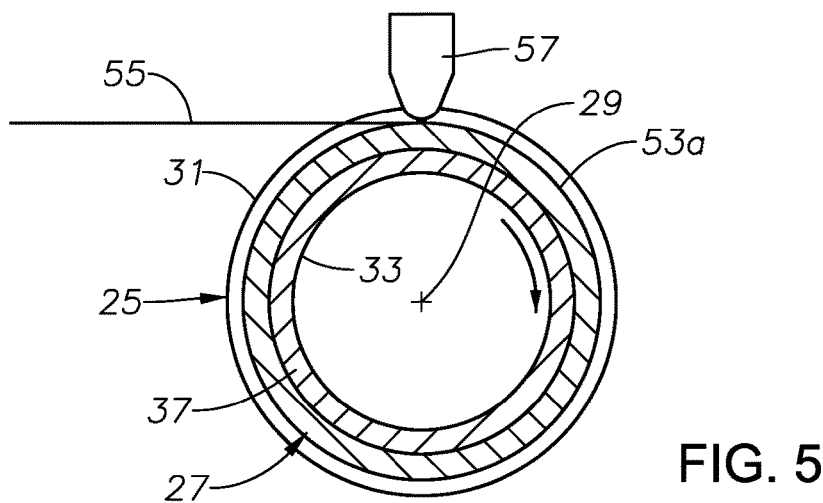
FIG. 5 is a schematic view taken along the line 2-2 of FIG. 2 and illustrating the metal foil of the FIG. 2 embodiment being welded around the components.

Various types of ultrasonic welding equipment exists. In this weld process, after the portions of annular recess 53 are machined, adapter 25 is secured to motor housing 27 with threads 39, 49. Once secured, adapter 25 and motor housing 27 are aligned in a lathe or other piece of machinery that allows the connected adapter 25 and motor housing 27 to be rotated about longitudinal axis 29. Referring to the schematic of FIG. 5, a strip of the metal foil 55, which may be in a roll initially, is aligned on recess base 53a. An ultrasonic welding head 57 is positioned over the strip of metal foil 55 and a desired amount of pressure is applied. A control unit (not shown) causes ultrasonic head 57 to vibrate while adapter 25 and motor housing 27 are rotated in the direction indicated by the arrow. The control unit controls the feed rate of metal foil 55 as adapter 25 and motor housing 27 rotate. One complete rotation results in one layer of metal foil 55 being welded to and around recess base 53a. The process continues until the desired number of layers of metal foil 55 are welded to each other and to recess base 53a. The frequency is in a range from 15 kHz to 300 kHz, and more likely in a 20 kHz to 40 KHz range.

Figure 3:
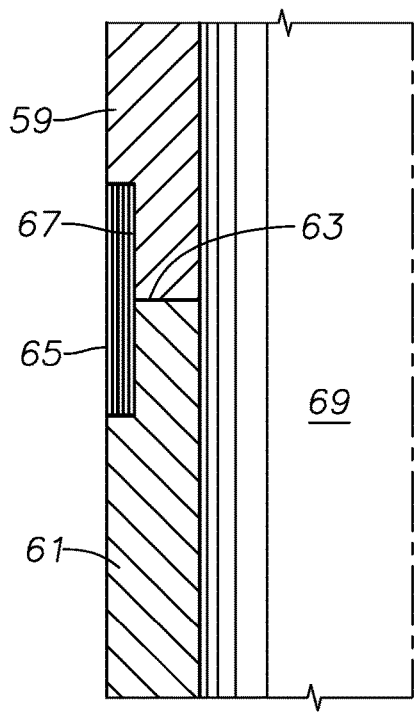
FIG. 3 is sectional view of an alternate arrangement, showing layers of a thin metal foil ultrasonically welded around a joint of two components, wherein the weld formed provides sealing as well as a load bearing connection between the two components.

FIG. 3 illustrates an alternate embodiment of two components 59, 61 secured together. Components 59, 61 may be an adapter and a housing of any one of the modules of ESP 13. Each component 59, 61 is a cylindrical tubular member. Components 59, 61 are shown end-to-end with end faces 63 in abutment with each other. Metal foil 65 is ultrasonically welded in multiple layers around and to an annular recess 67 formed on the mating ends of components 59, 61. In this example, metal foil 65 provides the only load bearing connection securing components 59, 61 to each other. There are no engaging threads between components 59, 61 in the embodiment of FIG. 3. Metal foil 65 also provides the only seal from the exterior through the joint between end faces 63 to the interiors 69 of components 59, 61.

Figure 4:
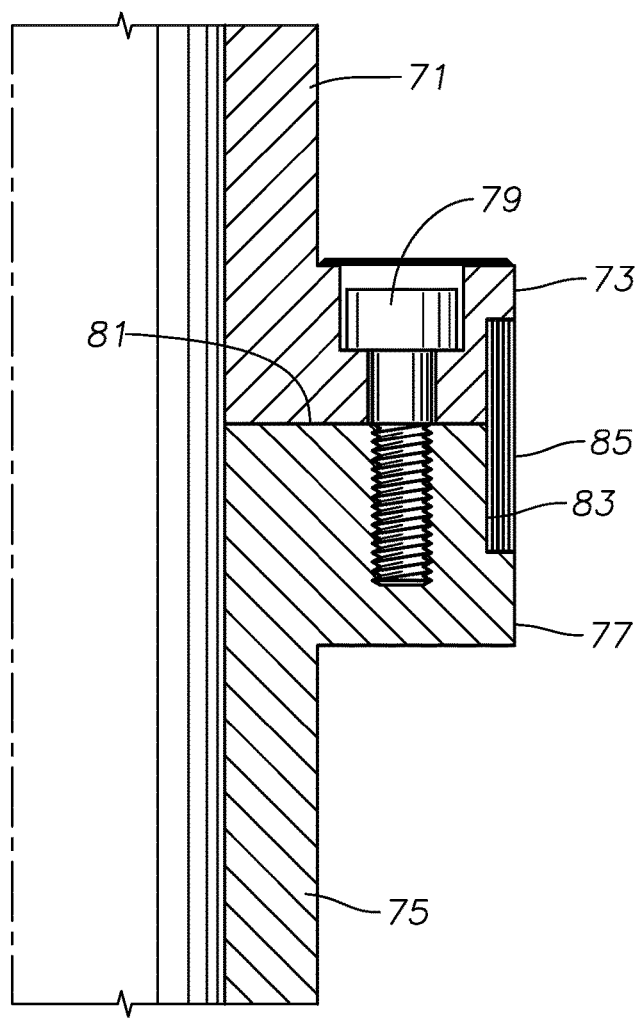
FIG. 4 is sectional view of another alternate arrangement, show parts of two components with flanges bolted together with layers of a thin metal foil ultrasonically welded around mating flanges of the two components to provide a metal barrier against entry of well fluid into the joint.

FIG. 4 illustrates another embodiment of a connection between modules of ESP 13. In this example, first adapter 71 may be joined to a housing (not shown) of its module, either conventionally or by the techniques of either FIG. 1 or FIG. 2. For example, first adapter 71 could be lower seal section adapter 26 (FIG. 1). First adapter 71 has a flange 73 with bolt holes, the flange serving as a threaded connection member for first adapter 71. Second adapter 75 may be joined to a housing (not shown) of its module, either conventionally or by the techniques of either FIG. 1 or FIG. 2. For example, second adapter 75 could be motor head adapter 25. Second adapter 75 has a cylindrical portion, which may be considered to be a flange 77, with threaded bolt holes for receiving bolts 79 passing through the bolt holes of flange 73. Flanges 73, 77 have abutting end faces 81, resulting in a joint with a potential leak path to the interiors of adapters 71, 75.

An annular recess 83 is formed in outer cylindrical surfaces of flanges 73, 77. In this example, the upper half of annular recess 83 is on flange 73 and the lower half on flange 77. A metal foil 85 is ultrasonically welded to flanges 73, 77 at recess 83. As in the other embodiments, metal foil 85 may have multiple layers welded to each other. In this embodiment, the modules of adapters 71, 75 may be bolted to each other and welded in a factory or field office, then brought to the well site connected together.

Metal foil 85 may provide the only seal against well fluids flowing in the joint between end faces 81 to interiors of adapters 71, 75. There is no additional seal ring shown, but one could be installed between end faces 81 as a backup. Bolts 79 provide the load supporting part of the connection.

The present disclosure described herein, therefore, is well adapted to carry out the objects and attain the ends and advantages mentioned, as well as others inherent therein. While only a few embodiments of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A downhole well assembly, comprising:
    tubular first and second components having a common longitudinal axis, cylindrical exterior surfaces and end faces that face each other, defining a joint between the end faces; and
    a plurality of layers of a metal foil wrapped around the cylindrical exterior surfaces of the first and second components concentric with the axis and over the joint, the layers being ultrasonically welded to each other and to the exterior surfaces of the first and second components around the joint, sealing the entry of well fluids into the joint;
    an annular recess extending around the joint concentric with the axis, the annular recess having a base portion formed on the cylindrical exterior surface of the first component adjacent the end face of the first component and another base portion formed on the exterior surface of the second component adjacent the end face of the second component, the base portions of the annular recess being cylindrical and concentric with the axis; and wherein
    the layers of metal foil are welded around the recess to the base portions of the recess.

2. The assembly according to claim 1, further comprising:
    a nose of the first component extending past the end face of the first component into the interior of the second component; and
    mating threads on an exterior of the nose and an internal side wall of the second component.

3. The assembly according to claim 2, further comprising:
    a seal ring sealing between an exterior portion of the nose and the internal side wall of the second component.

4. The assembly according to claim 1, wherein:
    the end faces abut each other; and
    the metal foil provides a sole load bearing connection between the first and second components.

5. The assembly according to claim 1, further comprising:
    an external flange extending outward from each of the first and second components, the flanges having abutting surfaces that define the end faces, the flanges being bolted together; and
    wherein the cylindrical exterior surfaces are located on outer diameters of each of the flanges.

6. The assembly according to claim 1, wherein:
    the assembly comprises an electrical submersible pump having first and second modules;
    the first component comprises an adapter of the first module, the adapter having a threaded connector that secures the first module to the second module; and the second component comprises a tubular housing of the first module.

7. The assembly according to claim 6, further comprising:
a nose on the adapter that extends into an interior of the second module; and
mating threads between the nose and an internal side wall of the second module.

8. The assembly according to claim 1, wherein:
the assembly comprises an electrical submersible pump having a motor module and a seal section module;
the first component comprises an adapter of the motor module, the adapter having an bolt holes for securing the motor module to the seal section module; and
the second component comprises a tubular motor housing.

9. A downhole well assembly, comprising:
tubular first and second components having a common longitudinal axis, cylindrical exterior surfaces and end faces that face each other, defining a joint between the end faces;
a nose of the first component extending past the end face of the first component into the interior of the second component;
mating threads on an exterior of the nose and an internal side wall of the second component;
an elastomeric seal ring sealing between an exterior portion of the nose and the internal side wall of the second component;
an annular recess in the cylindrical exterior surfaces of the first and second components at the joint, the annular recess having a base portion adjacent the end face of the first component and another base portion adjacent the end face of the second component, the base portions of the annular recess being cylindrical and concentric with the axis; and
an ultrasonic weld extending around the annular recess that welds the first and second components to each other, the ultrasonic weld comprising a plurality of layers of a metal foil wrapped around the base portions in the annular recess concentric with the axis and over the joint, the layers being ultrasonically welded to each other and to the base portions of the annular recess, sealing the entry of well fluids into the joint and into contact with the seal ring.

10. The assembly according to claim 9, wherein:
the ultrasonic weld has an outer diameter that is flush with an outer diameter of the annular recess.

11. The assembly according to claim 9, wherein:
the assembly comprises an electrical submersible pump having first and second modules;
the first component comprises an adapter of the first module, the adapter having a threaded connector that secures the first module to the second module; and
the second component comprises a tubular housing of the first module.

12. A downhole well assembly, comprising:
tubular first and second components formed of a carbon steel and having a common longitudinal axis, cylindrical exterior surfaces and end faces that face each other, defining a joint between the end faces;
a nose of the first component extending past the end face of the first component into the interior of the second component;
mating threads on an exterior of the nose and an internal side wall of the second component;
an elastomeric seal ring sealing between an exterior portion of the nose and the internal side wall of the second component;
an annular recess in the cylindrical exterior surfaces of the first and second components at the joint, the annular recess having a base portion adjacent the end face of the first component and another base portion adjacent the end face of the second component, the base portions of the annular recess being cylindrical and concentric with the axis; and
an ultrasonic weld extending around the annular recess that welds the first and second components to each other, the weld comprising a plurality of layers of a stainless steel foil wrapped around each other and the base portions in the annular recess concentric with the axis and over the joint, the layers being ultrasonically welded to each other and to the base portions of the annular recess, sealing the entry of well fluids into the joint and into contact with the seal ring; and wherein
the layers define an outer diameter for the ultrasonic weld that is the same as an outer diameter of the annular recess.

* * * * *

UNITED STATES PATENT AND TRADEMARK OFFICE
CERTIFICATE OF CORRECTION

PATENT NO. : 10,830,025 B2
APPLICATION NO. : 16/150181
DATED : November 10, 2020
INVENTOR(S) : Cain It is certified that error appears in the above-identified patent and that said Letters Patent is hereby corrected as shown below:

In the Specification

Column 1, Line 13, reads: "The present disclosure relates to an electrical submersible" - It should read: --The present disclosure relates to electrical submersible--;

Column 2, Line 43, reads: "show parts of two components with flanges bolted together" - It should read: --showing parts of two components with flanges bolted together--; and In the Claims In Claim 8, Column 7, Line 12, reads: "module, the adapter having an bolt holes for securing" - It should read: --module, the adapter having bolt holes for securing--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*